United States Patent [19]

Yalpani

[11] Patent Number: 5,229,158
[45] Date of Patent: Jul. 20, 1993

[54] POLYHYDROXYALKANOATE CREAM SUBSTITUTES

[76] Inventor: Manssur Yalpani, 2860 White Oak La., Buffalo Grove, Ill. 60089

[21] Appl. No.: 616,511

[22] Filed: Nov. 21, 1990

[51] Int. Cl.$^5$ .............................................. A23G 9/00
[52] U.S. Cl. ................................. 426/565; 426/531; 426/566; 426/572; 426/580; 426/582; 426/583; 426/586; 426/589; 426/605; 426/804
[58] Field of Search ............... 426/531, 601, 611, 804, 426/565, 566, 580, 582, 583, 586, 589, 605, 572; 435/146

[56] References Cited

PUBLICATIONS

Ratledge, "Lipid Biotechnology: a wonderland for the microbial physiologist", JOAOC, vol. 64, #12, pp. 1647–1656, 1987 Abstract.

Primary Examiner—Joseph Golian
Assistant Examiner—Evan Federman
Attorney, Agent, or Firm—John M. Sanders

[57] ABSTRACT

Macrocolloids of polyhydroxyalkanoates are used as fat substitutes. Polyhydroxybutyrate is the preferred homopolymer. The polymeric particles can have a particle size of from 0.1–10 microns.

16 Claims, 1 Drawing Sheet

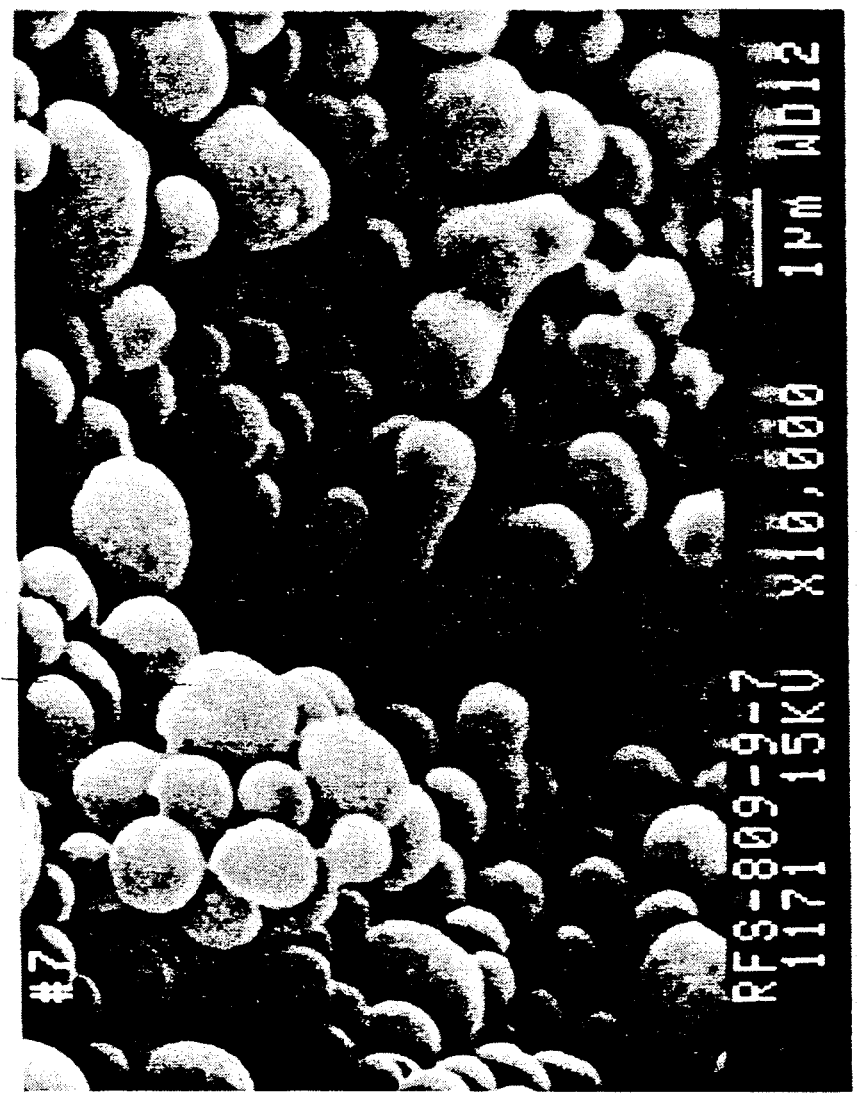

POLYHYDROXYALKANOATE CREAM SUBSTITUTES

BACKGROUND OF THE INVENTION

The present invention relates to the use of microparticulated polyhydroxyalkanoate compositions (PHA) as cream substitutes and to low-fat and no-fat foods products containing PHAs to reduce or eliminate fat. Additionally, the present invention relates to a method of reducing or eliminating fat/cream in food products by substituting PHAs for all or a portion of the fat normally found in the traditional food.

Poly(hydroxyalkanoates) (PHAs) are well-known polyester compounds produced by a variety of microorganisms, such as bacteria and algae. A PHA polyester can include the same or different repeating units, depending upon the choice of carbon source substrates and fermentation conditions employed in the production of the PHA. One particular PHA including the same repeating units is poly(3-hydroxybutyric acid), or poly(3-hydroxybutyrate), termed PHB, and having the structural formula:

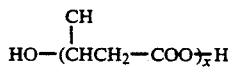

wherein x represents an integer of from 500 to about 17,000.

PHB is a natural storage product of bacteria and algae, and is present as discrete granules within the cell cytoplasmic space. However, unlike other, biologically-synthesized polymers such as proteins and polysaccharides, PHB is thermoplastic having a high degree of crystallinity and a well-defined melting point at about 180° C. But, PHB is unstable at its melting point and degrades, essentially quantitatively, to crotonic acid at a temperature slightly above its melting point. Accordingly, practical applications for this natural, biodegradable polyester have been limited. Therefore, investigators have studied other PHAs, such as the biodegradable copolyester poly(hydroxybutyrate-co-valerate), including both of the monomeric units 3-hydroxybutyrate and 3-hydroxyvalerate, in order to discover a PHA having sufficient thermal stability and other suitable chemical and physical properties for use in practical applications.

Generally, a PHA is synthesized by a microorganism. However, some PHA compounds have been synthesized chemically, such as by polymerization of racemic and optically-active butyrolactone or other suitable monomers. Such chemically-synthesized PHA polyesters exhibit a relatively low average molecular weight, and the synthesis is not economically viable. In general, the following publications provide background information for PHA polymers, both in regard to their synthesis and their properties:

1) E. A. Dawes, et al., *Adv. Microb. Physiol.*, 10, p. 135 (1973);
2) P. A. Holmes, "Developments in Crystalline Polymers-2", D. C. Basset, ed., Elsevier Applied Science, London, Chap. 1, pp. 1–65 (1988); and
3) P. A. Holmes, *Phys. Technol.*, 16, pp. 32–36 (1985).

The preparation, extraction and purification, of a PHA by a biosynthetic process is known. For example, Richardson in European Patent Application Serial No. 046,344, and Lafferty et al. in U.S. Pat. No. 4,786,598, disclose the preparation of poly-D-(−)-3-hydroxybutyric acid (PHB) by culturing the microorganism *Alcaligenes latus* or a mutant thereof. Walker et al., in U.S. Pat. No. 4,358,583, teach the extraction and purification of poly(3-hydroxybutyric acid) from the cells walls of PHB-producing microorganisms. Furthermore, the bacterial synthesis of various co-poly(hydroxyalkanoates), such as the copolymer of 3-hydroxybutyric acid and 3-hydroxypentanoic acid, is described in publications such as:

Y. Doi, et al., "Production of Copolyesters of 3-Hydroxybutyrate and 3-Hydroxyvalerate by *Alcaligenes eutrophus* from Butyric and Pentanoic Acids", *Appl. Microbiol. Biotechnol.*, 28, pp. 330–334 (1988);

Doi, U.S. Pat. No. 4,876,331;

Holmes, *Phys. Technol.*, 16, pp. 32–36 (1985);

M. Kunioka, et al., "Crystalline and Thermal Properties of Bacterial Copolyesters: Poly(3-Hydroxybutyrate-co-3-hydroxyvalerate) and Poly(3-Hydroxybutyrate-co-4-hydroxybutyrate)", *Macromolecules*, 22, pp. 694–697 (1989); and R. Gross, et al., "Biosynthesis and Characterization of Poly(s-Hydroxyalkanoates) Produced by *Pseudomonas oleovorans*", *Macromolecules*, 22, pp. 1106–1115 (1989).

The above-listed patents and publications are representative of the state of the art relating to PHAs. In general, the homopolymeric and copolymeric PHAs described in the above references are attempts to improve the physical and chemical properties of the PHA by altering the carbon source for the biological synthesis of the PHA, or are attempts to find a suitable microorganism to produce a sufficient amount of the desired PHA. In general, a poly(hydroxyalkanoate) has the general structural formula (I), wherein R is hydrogen or an alkyl group having 1–12 carbon atoms, and the term "x" is the number of repeating units usually from about 500 to about 17,000. The term "alkyl" when used herein is meant to encompass cyclic, branched, saturated and unsaturated alkyl groups. As illustrated in general structural formula (I), a PHA is a polyester having a hydroxy-terminated end and a carboxy-terminated end. The most widely-known and intensively-studied

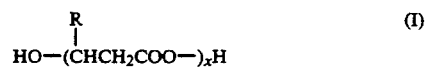

poly(hydroxyalkanoate) is the previously-described, biodegradable PHA known as poly(hydroxybutyrate), or PHB, wherein the R substitutent in general structural formula (I) is methyl. However, PHAs having an R substituent of up to nine carbon atoms have been biosynthesized and studied, as have PHAs including 4-hydroxybutyrate [(—CH₂CH₂CH₂CO₂—)ₓ] as a repeating unit.

In addition, copolymers of general structural formula (II) have been biosynthesized by the appropriate choice of carbon substrates. For example, the copolymer of general structural formula (II),

wherein b and c represent the number of repeating units (wherein b+c equals from 500–17,000), R4 is methyl and R5 is ethyl, known as poly(hydroxybutyrate-covalerate) or (P[HBcoHV)), has been biosynthesized and studied. In general, the copolyesters of general structural formula (II) wherein the substituents R4 and R5 independently, are hydrogen or an alkyl or alkenyl group including up to nine carbon atoms are known. Alkenyl-branched PHA's are described by K. Fritzsche, in "Production of Unsaturated Polyesters by *Pseudomonas oleovorans*", Int. J. Biol. Macromol, Vol. 12, pp. 85-91 (1990). In addition, a terpolymer of structural formula (III) has been biosynthesized by the bacterium *Rhodospirillum rubrum* from a carbon source including 3-hydroxybutyric acid, 3-hydroxypentanoic acid and 4-pentenoic acid.

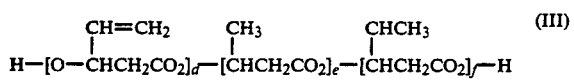

wherein d, e and f represent the number of repeating units and d+e+f equals from about 500-17,000. This terpolymer is described by R. Gross et al. in the publication, "The Biosynthesis and Characterization of New Poly(e-Hydroxyalkanoates)", in Polymer Preprints, 30(1), pp. 492-493 (1989).

The biologically-synthesized PHAs exhibit a molecular weight of up to about 1,500,000 daltons. These high molecular weight, biologically-synthesized PHAs can be degraded, or depolymerized, to yield a PHA having a molecular weight as low as about 3000 daltons. For example, Trathnigg et al., in Angew. Macromol. Chem., 161, p. 1-8 (1988), described the preparation of a low molecular weight PHB by a controlled acid hydrolysis of a high molecular weight, biologically-synthesized PHB using aqueous formic, acetic or butyric acid at an elevated temperature of 90°-100° C. Similarly, B. Heuttecoeur, et al., in *C. R. Hebd. Seances Acad. Sci.*, 274, pp. 2729-2732, (1972), describe the partial alkaline degradation of PHB, and S. Akita, et al., in *Macromolecules*, 9, pp. 774-780 (1976), describe the alcoholysis of PHB with methanol and p-toluenesulfonic acid. The methods of Trathnigg, et al and Heuttecoeur, et al provide a degraded PHB polymer with a carboxylic acid or a carboxylate terminal group, whereas the method of Akita provides an ester terminal group. Also see S. Coulombe, et al., "High-Pressure Liquid Chromatography for Fractionating Oligomers from Degraded Poly(s-Hydroxybutyrate)", *Macromolecules*, 11, pp. 279-280 (1978); and A. Ballistreri, et al., "Sequencing Bacterial Poly(s-Hydroxybutyrate-co-o-hydroxyvalerate) by Partial Methanolysis, High-Performance Liquid Chromatography Fractionation and Fast Atom Bombardment Mass Spectrometry Analysis", *Macromolecules*, 22, pp. 2107-2111 (1989).

H. Morikawa et al. in *Can. J. Chem.*, 59, pp. 2306-2313, (1981) demonstrated that thermal degradation of a PHA copolyester yields monomeric, oligomeric and polymeric PHAs with olefinic terminal groups. Morikawa et al. pyrolyzed PHB to yield crotonic acid and oligomers of PHB having a terminal crotonate moiety, as shown in the polyester of structural formula (IV) wherein k is from 500 to about 17,000. Therefore, pyrolysis of a PHA can provide an

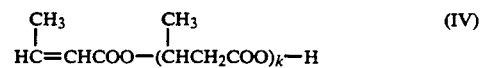

oligomer with a reactive vinyl terminal group as a site for further chemical modification of the degraded PHA.

Accordingly, from the above degradation methods, i.e. acidic hydrolysis, alkaline hydrolysis, alcoholysis or pyrolysis, a high molecular weight, biologically-synthesized PHA can be degraded to a relatively low molecular weight PHA that includes one of a variety of reactive terminal functionalities, including hydroxyl, free carboxylic acid, carboxylate, ester, and olefinic functionalities. These reactive terminal functionalities therefore allow the introduction of numerous other types of terminal functionalities onto the degraded PHA polyester.

In the past, interest in PHAs concentrated on their unique biodegradable and biocompatible properties, as well as their various physical properties that range from thermoplastic to elastomeric. The physical and chemical properties inherent to PRAs suggest a variet of applications, such as in controlled drug release systems, biomedical devices, specialty packaging materials, and numerous agricultural applications. However, while PHAs are of general interest because of their biodegradable nature, their actual use as a plastic material has been hampered by their thermal instability. For example, poly-3-hydroxybutyrate is thermoplastic, but also is thermally unstable at temperatures exceeding its melting point of about 180° C. N. Grassie, et al., in *Polym. Degrad. Stabil.*, 6, pp. 47-61 (1984), disclose that a substantial molecular weight reduction of PHB occurs by heating PHB in the temperature range of 180°-200° C. The inherent thermal instability of PHB is partially overcome by incorporating a second monomer unit into the polyester. The melting point of a PHB can, for instance, be reduced to 75° C., as in (P[HBcoHV)) including about 40 mol % 3-hydroxyvalerate, resulting in a polymer that is thermally stable up to about 160° C. However, further enhancements in the thermal stability of PHAs are necessary for their practical use in commercial applications. Also see M. Kunioka, et al., *Macromolecules*, 23, pp. 1933-1936 (1990).

Accordingly, prior investigators have studied the chemical and biological synthesis of PHAs, and the degradation of PHAs, in attempts to provide a biodegradable polymer having physical and chemical properties suitable for consumer, industrial and agricultural applications. However, the prior investigators have studied essentially only homopolymeric and copolymeric hydroxyalkanoates. In general, to date, very few known references are directed to a compound, or its method of preparation, including a PHA polymer functionalized with a moiety other than a poly(hydroxyalkanoate).

Some investigators, like P. B. Dave et al., in "Survey of Polymer Blends Containing Poly(3-Hydroxybutyrate-co-16% Hydroxyvalerate", in *Polymer Preprints*, 31(1), pp. 442-443 (1990), studied the physical compatibility of a PHA blended with other commercial polymers. However, these were physical blends of a PHA with a second polymer, like a poly(ethylene oxide), and did not include a PHA polymer covalently attached to a molecule or a polymer other than a PHA. R. I. Hollingsworth et al. in Carbohydrate Research, 134, pp. C7-C11 (1984) and R. I. Hollingsworth et al. in *Journal of Bacteriology*, 169(7), pp. 3369-3371 (1987) found 3-hydroxybutyrate covalently attached as a noncarbohydrate substituent in the acidic capsular polysaccharide and extracellular polysaccharide of *Rhizobium trifolii.*

However, the 3-hydroxybutyrate substituent was monomeric and was substituted biologically, not chemically. M. S. Reeve et al., in "The Chemical Degradation of Bacterial Polyesters for Use in the Preparation of New Degradable Block Polymers", *Polymer Preprints*, 31(1), pp. 437–438 (1990), disclose a polyurethane-type copolymer derived from the reaction of 4,4'-diphenylmethane diisocyanate with polyethylene glycol and degraded PHB, and disclose a PHB-polystyrene block copolymer derived from degraded PHB and a polystyrene prepolymer including a carboxylic acid functionality.

SUMMARY OF THE INVENTION

Briefly, in accordance with the present invention, polyhyroxyalkanoate (PHA) particles display fat-like mouthfeel characteristics when the particles have a mean diameter distribution in the range of from about 0.1 to about 10 microns ($\mu$) and are dispersed in an aqueous phase as a macrocolloid. The particles are preferably spheroidally shaped, substantially non-aggregated and exhibit a substantially smooth organoleptic character of an oil-in-water emulsion. The present macrocolloid can replace all or a portion of the fat or cream in food products such as ice cream, yogurt, salad dressings, mayonnaise, cream, cream cheese, other cheeses, sour cream, sauces, icings, whipped toppings, frozen confections, milk, coffee whitener and spreads.

Of particular interest, PHB and P(HBcoHV) are formed into stable suspensions of spheroidal particles having a particle size distribution effective to impart a substantially smooth organoleptic character of an oil-in-water emulsion, i.e., mouthfeel of fat/cream.

BRIEF DESCRIPTION OF THE DRAWING

FIG. 1 is a photograph of a scanning electron microscope field (10,000$\times$) of a copolymer of P(HBcoHV) that has about 27% by weight hydroxy-valerate monomer.

DETAILED DESCRIPTION OF THE INVENTION

In practicing the present invention, PHA particles, are added to fat/cream-containing food products to replace all or a portion of the fat/cream normally present in the food. The resulting food products have the creamy mouthfeel of their fatty counterparts. Preferably the particles have a substantially spheroidal shape and a mean diameter particle size distribution between about 0.1 and about 10 microns ($\mu$).

Any naturally harvested or synthetically produced PHA which can attain a substantially spheroidal or substantially round shape in the 0.1–10 $\mu$ diameter size range is acceptable in practicing the present invention. The PHAs are made according to well known procedures described hereinbefore. Suitable PHAs include PHB and P(HBcoHV). The PHA can also be a copolymer of hydroxybutyrate and a C—C alkanoate. Mixtures of different PHAs can also be employed. Preferred PHAs include those harvested naturally as granules in bacteria. Synthetically produced PHAs must be substantially spheroidal in shape and have a mean particle size diameter of from about 0.1 to about 10 $\mu$.

Once the PHA macro-colloidal particles are formed they must be substantially non-aggregated and remain that way. Aggregate blocking agents, for example, pectin, lecithin and xanthan gum, can be added to the macrocolloid to stabilize the particles. U.S. Pat. Nos. 4,734,287 and 4,961,953, which are incorporated herein by reference, disclose protein macrocolloids useful as fat substitutes and aggregate blocking agents.

The particle size distribution of PHAs can be controlled in a number of ways, including: (a) dissolving the PHA in a suitable polar organic solvent, such as methylene chloride, chloroform, dimethylsulfoxide (DMSO), dimethylformamide (DMF, etc., and then forcing the dissolved PHA through a spinerette, syringe, small diameter orifice, or other suitable device at a high speed (rate) in a continuous or intermittant manner to a non-solvent, (one in which the PHA is insoluble in) such as water, alcohol, or a non-polar organic solvent, etc., to cause precipitation of PHA; (b) dissolving the PHA in a suitable solvent, and then removing the solvent either by evaporation under high speed shear conditions, by spray drying, stirring or other suitable methods to cause precipitation of PHA granules; or (c) dissolving the PHA in a suitable solvent at elevated temperatures, and then preparing a PHA gel by reducing the temperature of the solution to ambient, and, if appropriate, then treating the thus obtained gel particles under high shear conditions in a homogenizer, blender, or other suitable device, to obtain the desired particle size. A suitable mixing apparatus is described in U.S. Pat. No. 4,828,396 which is incorporated herein by reference.

Generally, the hydrated PHA macrocolloid will have from about 5 to about 50 weight percent or more solids. When added to food products, the hydrated macrocolloid is substituted generally on equal weight basis of the fat being removed, i.e., 1 part by weight fat/cream is replaced with 1 part by weight of hydrated macrolloid. More or less macrocolloid can be employed based on the desired creaminess of the resulting food.

In preparing the present low-fat and no-fat food products the PHA macrocolloid is added to the food in place of all or a portion of the fat or cream normally present in this food. The order of addition of the PHA is not critical to the practice of the present invention. The PHA macrocolloid is blended with the other food ingredients employing standard blending techniques well known to one skilled in the art.

The present PHA macrocolloid can be combined with other fat/cream substitutes, such as, for example, microparticulated proteins and carbohydrates, sucrose polyesters (olestra), protein/xanthan gum complexes and other types of fat sparing agents, i.e., starches, gums, thickeners, etc.

In similar embodiments, the various PHA compositions described herein act as a fat/cream substitute in foods. The PHA particles are substantially spheroidal in shape and have a particle size distribution effective to impart an organoleptic character of an oil-in-water emulsion, i.e., a cream. The mean diameter particle size distribution ranges from about 0.1 to about 10 $\mu$.

Additionally, the PHAs can be used as a carrier for flavors and colors as described in copending application Ser. No. 616,510 filed evendate herewith entitled POLYHYDROXYALKANOATE FLAVOR DELIVERY SYSTEM which is incorporated herein by reference.

We claim:

1. A method of simulating the mouthfeel of fat and/or cream in a food product which comprises adding to the food a water-dispersable macrocolloid of substantially non-aggregated PHA particles of the formula

wherein
R represents a $C_1$-$C_{12}$ alkyl which can be the same or different on each repeating monomeric unit and x represents an integer of from 500-17,000
wherein the PHA particles have a substantially spheroidal shape and a mean particle size distribution ranging from about 0.1 microns to 10 microns.

2. The method of claim 1 wherein the PHA is a homopolymer.

3. The method of claim 2 wherein R is methyl.

4. The method of claim 1 wherein the PHA a copolymer of hydroxybutyrate and hydroxyvalerate.

5. The method of claim 1 wherein the PHA is a copolymer or terpolymer.

6. The method of claim 1 wherein the PHA is a copolymer of hydroxybutyrate and a $C_2$-$C_{12}$ alkanoate.

7. In a food product containing a fat and/or cream, the improvement which comprises: substituting for all or a portion of the fat and/or cream, a water-dispersable macrocolloid of substantially non-aggregated PHA particles of the formula

wherein
R represents a $C_1$-$C_{12}$ alkyl which can be the same or different on each repeating monomeric unit and x represents an integer of from 500-17,000
wherein the PHA particles have a substantially spheroidal shape and a mean particlesize distribution ranging from about 0.1 microns to 10 microns.

8. The improved food product of claim 7 which is selected from the group consisting of ice cream, yogurt, mayonnaise, cheese, milk, an icing, a spread, sour cream, coffee whitener, whipped topping, cream, and a sauce.

9. The improved food product of claim 8 which is ice cream.

10. The improved food product of claim 8 which is salad dressing.

11. The improved food product of claim 7 wherein the PHA is a homopolymer.

12. The improved food product of claim 7 wherein R is methyl.

13. The improved food product of claim 7 wherein the PHA is a copolymer of hydroxybutyrate and hydroxyvalerate.

14. The improved food product of claim 7 wherein the PHA is a copolymer or terpolymer.

15. The improved food product of claim 7 wherein the PHA is a copolymer of hydroxybutyrate and a $C_2$-$C_{12}$ alkanoate.

16. The improved food product of claim 7 which is cream cheese.

* * * * *